(12) United States Patent
Ganem et al.

(10) Patent No.: US 11,472,260 B2
(45) Date of Patent: Oct. 18, 2022

(54) HOME AIR PURIFICATION SYSTEM

(71) Applicant: SEB S.A., Ecully (FR)

(72) Inventors: Mathias Ganem, Lyons (FR); Sébastian Gauthier, Lyons (FR)

(73) Assignee: SEB S.A., Ecully (FR)

( * ) Notice: Subject to any disclaimer, the term of this patent is extended or adjusted under 35 U.S.C. 154(b) by 200 days.

(21) Appl. No.: 16/225,264

(22) Filed: Dec. 19, 2018

(65) Prior Publication Data
US 2019/0193508 A1      Jun. 27, 2019

(30) Foreign Application Priority Data

Dec. 21, 2017   (FR) ...................................... 1762691

(51) Int. Cl.
| | |
|---|---|
| *B60H 1/00* | (2006.01) |
| *B60H 3/06* | (2006.01) |
| *F24F 11/56* | (2018.01) |
| *F24F 11/65* | (2018.01) |
| *F24F 11/52* | (2018.01) |
| *F24F 8/10* | (2021.01) |
| *F24F 110/00* | (2018.01) |

(52) U.S. Cl.
CPC ............... *B60H 1/008* (2013.01); *B60H 3/06* (2013.01); *F24F 8/10* (2021.01); *F24F 11/52* (2018.01); *F24F 11/56* (2018.01); *F24F 11/65* (2018.01); *B60H 2003/0683* (2013.01); *F24F 2110/00* (2018.01); *F24F 2221/12* (2013.01)

(58) Field of Classification Search
USPC .......................................................... 454/75
See application file for complete search history.

(56) References Cited

U.S. PATENT DOCUMENTS

| 2013/0174646 A1* | 7/2013 | Martin | ..................... F24F 11/30 73/31.02 |
| 2015/0224437 A1* | 8/2015 | Nygren | ..................... F24F 11/30 95/1 |
| 2018/0306455 A1* | 10/2018 | Kelly | .................... F24F 3/1603 |

FOREIGN PATENT DOCUMENTS

| DE | 102015111034 A1 * | 1/2017 | ............... A61L 9/12 |
| EP | 2 905 584 A1 | 8/2015 | |
| EP | 2 905 584 B1 | 6/2017 | |

(Continued)

OTHER PUBLICATIONS

DE-102015111034-MT; machine translation of DE-102015111034-A1 from ESPACENET (Year: 2017).*

(Continued)

*Primary Examiner* — Avinash A Savani
*Assistant Examiner* — Ryan L Faulkner
(74) *Attorney, Agent, or Firm* — Pillsbury Winthrop Shaw Pittman LLP

(57) ABSTRACT

An air purification system includes an air purifier with a control unit and a filtration unit, at least one human-machine interface, at least one nomadic air sensor designed to be able to be coupled to the air purifier, or uncoupled from the air purifier, the control unit being designed to control the filtration unit according to at least one coupled operating mode taking into account measurement feedback from the air sensor, and one uncoupled operating mode not taking into account measurement feedback from the air sensor, wherein in the uncoupled operating mode of the air purifier, the human-machine interface is designed to display measurements from the nomadic air sensor.

20 Claims, 4 Drawing Sheets

(56) References Cited

FOREIGN PATENT DOCUMENTS

| FR | 3 026 020 A1 | 3/2016 |
|----|--------------|--------|
| GB | 2 224 863 A  | 5/1990 |
| JP | H05-3835 U   | 1/1993 |
| JP | 3080179 B2   | 8/2000 |

OTHER PUBLICATIONS

Search Report as issued in French Patent Application No. 1762691, dated Aug. 7, 2018.

* cited by examiner

HOME AIR PURIFICATION SYSTEM

CROSS-REFERENCE TO RELATED APPLICATIONS

This application claims priority to French Patent Application No. 1762691, filed Dec. 21, 2017, the entire content of which is incorporated herein by reference in its entirety.

FIELD

This invention concerns in general an air purifier system intended to be used in a house or dwelling of a user in order to clean, filter or purify the air of the dwelling.

BACKGROUND

The document EP2905584B1 discloses a home air purification appliance, but the system described does not allow informing the user on the air quality throughout the dwelling, and the user must place the appliance in each room in order to treat them one by one. This results in a waste of time and unnecessary effort, because if a room has acceptable air quality, it will be treated all the same.

SUMMARY

An aspect of the invention is to respond to the disadvantages of the aforementioned prior art document and in particular, first of all, to propose an air purifier system that allows the user to treat all the rooms in his dwelling without unnecessary efforts and operations.

To this end, a first aspect of the invention concerns an air purification system comprising:
 an air purifier with a control unit and a filtration unit controlled by the control unit,
 at least one human-machine interface,
 at least one nomadic air sensor configured to be:
 coupled to the air purifier, or
 uncoupled from the air purifier,
 the control unit being configured to receive from the at least one human-machine interface an instruction to control the filtration unit according to at least:
  one coupled operating mode taking into account measurement feedback from the coupled nomadic air sensor, and
  one uncoupled operating mode not taking into account measurement feedback from the uncoupled nomadic air sensor,
wherein in the uncoupled operating mode of the air purifier, the at least one human-machine interface is configured to display measurements from the uncoupled nomadic air sensor.

The air sensor is an air pollution sensor to measure air quality.

The system according to the above implementation comprises a nomadic air sensor which can be coupled to or uncoupled from the air purifier. In other words, the nomadic air sensor can be uncoupled in order to be displaced and detached from the purifier, and it will again be able to operate autonomously to measure the air quality (level of particles such as fine particles, presence of chemical compounds, such as volatile organic compounds, or biological compounds . . . ) and to communicate with the human-machine interface so that the latter displays the measurement results.

An aspect of the invention beneficially proposes to provide for the nomadic air sensor to be able to send measurement data to the human-machine interface so that these measurements are displayed. In this way, the user is informed about the air quality level.

In addition, if the uncoupled nomadic air sensor is in a space where the air purifier is not located, then the latter operates in the uncoupled operating mode, without taking into account the measurements from the nomadic air sensor, because they are not related to the space where the air purifier is located.

In addition, if the nomadic air sensor can be coupled to the air purifier to transmit the measurements to it in order to allow closed-loop operation, and uncoupled from the air purifier in order to allow uncoupled operation, it can be envisioned to attach the nomadic air sensor to the air purifier or to detach it from it independent of the coupled or uncoupled status. In particular, when the nomadic air sensor is in the uncoupled status in the remote location (another room in the dwelling), it is obviously detached from the air purifier, but in the coupled status, the nomadic air sensor can be attached to or detached from the air purifier. Finally, when the nomadic air sensor is attached to the air purifier, it can still be uncoupled to cut the transmission of measurements and to force operation in uncoupled operating mode.

In summary, the user can make the air purifier operate in uncoupled operating mode to improve the air quality of a first room in his dwelling, and at the same time, he can simply place the nomadic air sensor (detached and uncoupled) in a second room in his dwelling in order to take air quality measurements in this second room, which will be displayed by the human-machine interface. The measurement is performed at the same time, and without displacing the whole system and in particular the air purifier, which is typically an object whose weight and dimensions make it harder to handle than the simple nomadic air sensor.

In particular, according to the above implementation related to the system, the nomadic air sensor can be put in a coupled state after a coupling action, or be put in an uncoupled state after an uncoupling action. The coupled operating mode lasts as long as the nomadic air sensor is in the coupled state, and the uncoupled operating mode lasts as long as the nomadic air sensor is in the uncoupled state.

The human-machine interface may comprise control buttons, a display screen, or a touch screen.

Beneficially, in an embodiment, the uncoupled operating mode is an open-loop operating mode not taking into account any air sensor measurement feedback. According to this implementation, the air purifier operates as simply as possible, that is, continuously, without taking external feedback into account.

Beneficially, in an embodiment, the air purification system comprises at least one other air sensor, and the uncoupled operating mode comprises:
 a closed-looped operating mode taking into account measurement feedback from the at least one other air sensor, or
 an open-loop operating mode not taking into account any air sensor measurement feedback. According to this implementation, the system comprises several air sensors, one of which is the nomadic air sensor able to be moved to another room. The other air sensor can then stay in the same place as the air purifier and send it measurement results.

Beneficially, in an embodiment, the one other sensor is integrated in the air purifier. In particular, the other air sensor can be permanently installed on the air purifier. Minimalist functions can be envisioned for this other air sensor (the other air sensor measures only a portion of the parameters that the nomadic air sensor can measure), to be able to send the most important measurements to the air purifier (for example, only an overall presence of fine particles, and only one chemical species) and guarantee operation with a basic service. Since the nomadic air sensor takes more complete measurements, when it is coupled it will be able to provide all the other measurements to ensure optimal operation.

Alternatively, the other air sensor is a sensor external to the purifier, such as a sensor of a separate air conditioning unit, and can send data to the air purifier via wired or wireless transmission.

Alternatively, the other air sensor is a removable and portable sensor, configured to operate with a portable electronic appliance. Such basic sensors may provide the air purifier with measurements for closed-loop operation, while the nomadic air sensor is placed at a distance from the purifier to take autonomous measurements, for its part.

Beneficially, in an embodiment, in the coupled operating mode, the control unit takes into account:
  only the measurements from the nomadic air sensor, or
  measurements from the nomadic air sensor and measurements from the one other air sensor. According to the second option of this implementation, the control unit can receive measurements from both air sensors, and one can envision prioritizing how the data is taken into account (for example, the measurements from the more precise sensor are prioritized), or assigning a weighting (such as an average), or an additional consideration (for example, the nomadic air sensor measures only fine particles, and the other air sensor measures only certain chemical species).

Beneficially, in an embodiment, in the uncoupled or coupled operating mode of the purifier, the control unit takes into account the worst of the measurements among the measurements sent by the nomadic air sensor and by the other air sensor.

Beneficially, in an embodiment, the air purification system comprises a nomadic module which integrates the nomadic air sensor and the at least one human-machine interface.

Beneficially, in an embodiment, the nomadic module comprises a digital calculation unit. In other words, the nomadic air module is equipped to treat the measurements from the sensor itself, to send appropriate data either to the human-machine interface or to the control unit.

Beneficially, in an embodiment, the nomadic module comprises an autonomous fan unit, designed to create an airflow towards a measuring section of the nomadic air sensor. The sensor can then take reliable and representative measurements of the environment in which it is situated.

Beneficially, in an embodiment, the nomadic module comprises a system for storing electrical energy. The nomadic module is typically an autonomous wireless module.

Beneficially, in an embodiment, the air purification system comprises a portable electronic multimedia appliance, such as a touch tablet or a smart phone, designed to form the portable human-machine interface designed to display the measurements of the nomadic air sensor. It can be envisioned that the nomadic module and/or the nomadic air sensor does not have a display screen, but it can send measurement data to the portable electronic appliance that is equipped with a display screen. A radio link can be envisioned, or even a link by internet or the telephone network to send measurement data from the network to the portable electronic appliance and/or the human-machine interface.

Beneficially, in an embodiment, the air purifier comprises a human-machine interface designed to establish a data connection with the control unit, and to receive a command from a user and send the command to the control unit and/or to the filtration unit. The user can control the air purifier directly from the latter.

Beneficially, in an embodiment, the human-machine interface is a first human-machine interface designed to display the measurements from the uncoupled nomadic air sensor during the uncoupled operating mode, and the air purification system comprises a second human-machine interface designed to control the air purifier during the uncoupled operating mode.

The system comprises two human-machine interfaces, each one dedicated to a particular function, during the uncoupled operating mode: this helps the user to control the system.

Beneficially, in an embodiment, the first human-machine interface is integral with the nomadic air sensor. In other words, the nomadic air sensor is integrated in the first human-machine interface and together they form an autonomous and portable electronic unit.

Beneficially, in an embodiment, the second human-machine interface is integral with the air purifier. In other words, the second human-machine interface is installed on or integrated in the air purifier, which allows the user to directly control it by being nearby (in immediate proximity), even if the nomadic air sensor is at a distance (in another room).

It is possible to envision controlling the purifier from the first human-machine interface, or from the second human-machine interface, which allows the user full flexibility.

It is also possible to envision displaying the measurements of the nomadic air sensor on the first human-machine interface, but also on the second human-machine interface.

Beneficially, in an embodiment, the air purification system comprises additional contact terminals, designed to establish electrical contact between the air purifier and the nomadic air sensor when the latter is coupled (or attached) to the air purifier. It is possible to envision recharging a battery of the nomadic air sensor, and/or sending measurement data directly by the wire circuit.

Beneficially, in an embodiment, the air purification system comprises a contactless connection interface, designed to establish a contactless connection between the air purifier and the nomadic air sensor.

A second aspect of the invention is a method for using an air purification system according to the first aspect, comprising:
  controlling the air purifier from the at least one human-machine interface to make the filtration unit operate in a room of a dwelling,
  positioning the uncoupled nomadic air sensor in a location situated at a distance from the air purifier, for example in another room in the dwelling, and then controlling the filtration unit according to the uncoupled operating mode,
  displaying on the human-machine interface measurements from the nomadic air sensor.

This method makes it possible to measure an air quality at a location distant from the purifier, which then operates in uncoupled operating mode. It should be noted that the initial operation of the purifier may be either coupled or uncoupled operating mode. However, once the nomadic air sensor is in another room (and in an uncoupled state), the purifier then operates in uncoupled operating mode. The user can then check the air quality in one or more rooms without stopping or moving the air purifier.

Beneficially, in an embodiment, the method comprises:
moving the air purifier to the location previously situated at a distance,
controlling the air purifier from the at least one human-machine interface,
coupling the nomadic air sensor with the air purifier,
making the filtration unit operate according to the coupled operating mode in the location.

Beneficially, in an embodiment, if the nomadic air sensor is coupled and attached to the air purifier and if the purification unit is operating in coupled operating mode, then the method comprises a step consisting of automatically making the purification unit operate in uncoupled operating mode when the nomadic air sensor is detached from the air purifier.

Beneficially, in an embodiment, the purification unit is automatically controlled according to the coupled operating mode when the nomadic air sensor is attached again to the air purifier.

BRIEF DESCRIPTION OF THE DRAWINGS

Other characteristics and benefits of this invention will be seen more clearly by reading the following detailed description of an embodiment of the invention, provided as a non-restrictive example, and illustrated by the attached drawings in which.

DETAILED DESCRIPTION

Figure 1:
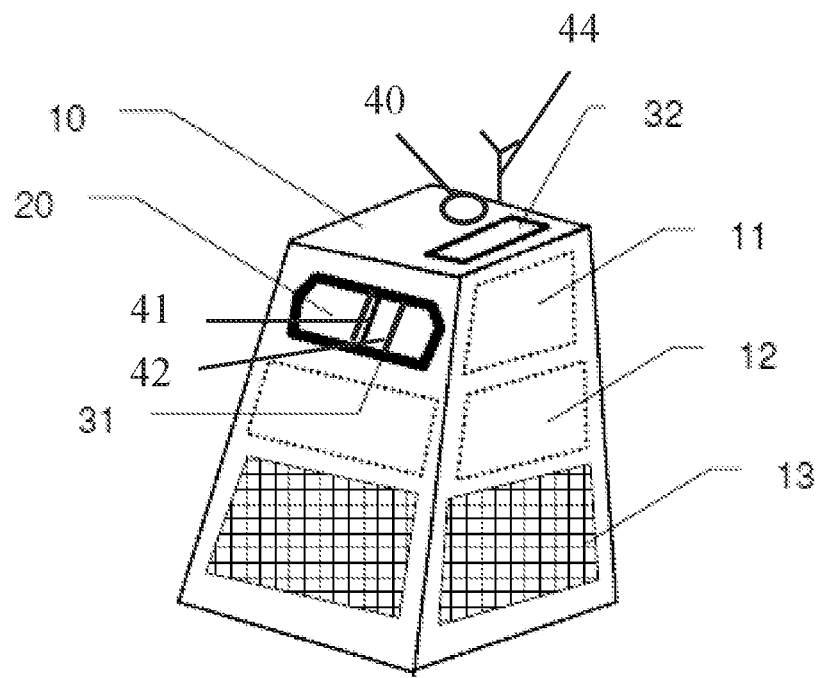
FIG. 1 represents a general view of an air purification system with a nomadic module coupled to an air purifier according to an embodiment of the invention.

FIG. 1 represents an air purification system which comprises an air purifier 10 which supports a nomadic module 20 coupled and attached to the air purifier 10.

Figure 5A:
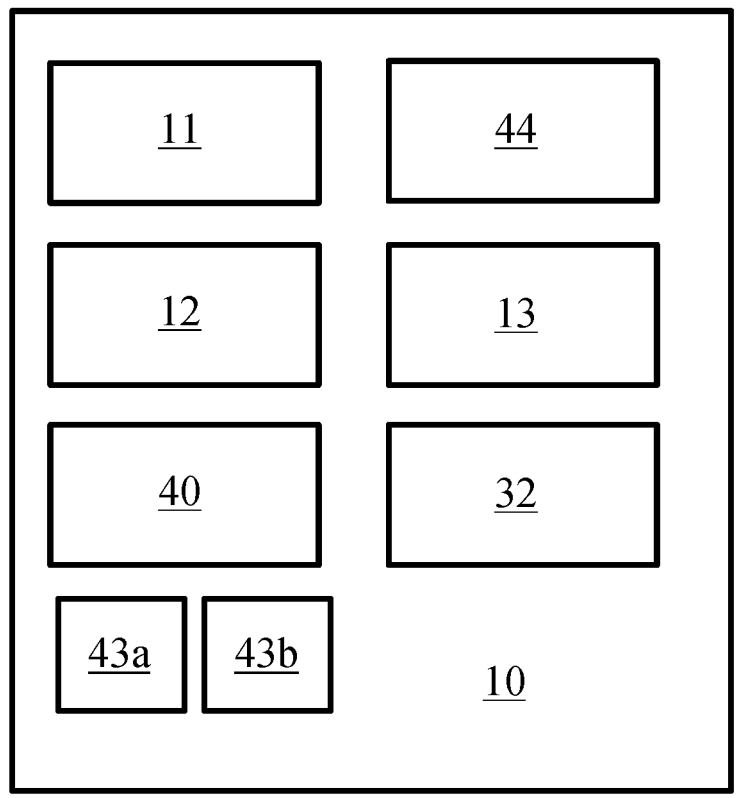

The air purifier 10 typically comprises a control unit 11 and a filtration unit 12 contained in a housing, so as to be able to filter and purify the air in one room of a dwelling of a user. It can be envisioned that the filtration unit 12 comprises a motorized fan and filters for removing particles and/or chemical compounds from the air. As shown in FIG. 5a, the air purifier 10 comprises additional contact terminals 43a, 43b, designed to establish electrical contact between the air purifier 10 and the nomadic air module 10 when the latter is coupled (or attached) to the air purifier. The air purifier system 10 comprises a contactless connection interface 44, designed to establish a contactless connection between the air purifier 10 and the nomadic air module 20.

For this purpose, it is possible to envision a first unit of filters to remove the particles, such as at least one HEPA filter, and a second unit of filters containing an active ingredient, such as activated carbon, to react with chemical compounds or living organisms.

In particular, it is possible to envision treating
airborne particles, having an aerodynamic diameter (or aeraulic diameter) smaller than 10 micrometers, called PM10,
finer particles, whose diameter is smaller than 2.5 micrometers, called "fine particles," or PM2.5,
volatile organic compounds (formaldehyde, benzene, etc.),
carbon monoxide. For this purpose, it is possible to envision a filtration structure like the one described in the document FR3026020A1, the disclosure of which is incorporated by reference in its entirety.

The air purifier also comprises grates 13 to allow the filtration unit 12 to establish an airflow with the space in which it is located.

The nomadic module 20 primarily comprises at least one nomadic air sensor, not pictured, configured to measure, in a non-restrictive manner, at least one or more of the following parameters:
a volatile organic compound content (formaldehyde, benzene, etc.)
a carbon monoxide content
a particle content (PM2.5, PM10)
a temperature
a relative humidity
an atmospheric pressure
a carbon dioxide content.

According to an embodiment, the nomadic module 20 may also comprise a human-machine interface 31, here in the form of a touch display screen, to control the control unit 11, and also to display measurements (or measurement results) taken by the nomadic air sensor. The nomadic module may comprise one or more electronic circuits configured to carry out its functions. For example, the nomadic module may also include a machine readable medium encoded with machine readable instructions, a processor to execute the instructions and a human-machine interface in communication with the processor.

The nomadic module 20 is configured to operate in cooperation with the air purifier 10 (in the coupled status) or autonomously (in the uncoupled status). In FIG. 1, the nomadic air module is attached and coupled to the air purifier 10, while in FIG. 2, it is uncoupled and detached from the air purifier 10, and in FIG. 2 there is a recess 14 formed in the air purifier 10 to contain the nomadic module 20 in a stable manner.

Consequently, a first coupled operating mode can be envisioned, in which, as in FIG. 1, for example, the air purifier 10 takes into account the measurements from the coupled nomadic air sensor 20 contained in the nomadic module to drive the filtration unit 12. In particular, if the nomadic air sensor detects a particle content or chemical or biological compound content higher than a threshold, then the control unit 11 drives the filtration unit 12 to filter and purify the surrounding air. Once the air quality is deemed satisfactory by the control unit 11 which receives the measurements from the nomadic air sensor, then the control unit 11 can control the filtration unit 12.

A second uncoupled operating mode may be envisioned. In this case, the control unit 11 receives an order from a human-machine interface to start according to the uncoupled operating mode, and then drives the filtration unit without taking into account the measurements from the nomadic air sensor contained in the nomadic module 20 which is uncoupled. According to the uncoupled operating mode, there is no interaction between the air purifier 10 and the nomadic module 20, whether the latter is attached or detached.

Consequently, the nomadic module 20 may be turned off or placed in a location at a distance from the air purifier 10, and operate autonomously, without communicating with the air purifier 10. In particular, the user can then place the nomadic module 20 in another room in his dwelling, and make the human-machine interface 31 of the nomadic module 20 display measurements or measurement results from the nomadic air sensor in order to know if the air quality in the room in question is satisfactory or not. This does not necessitate moving the air purifier 10 into this room of the dwelling, which in particular improves the ergonomics of the system. In addition, the uncoupled operating mode allows making the air purifier 10 operate without taking into account the measurements taken in another room.

However, it could very well be envisioned to use another air sensor 40 (see FIG. 5a) to provide measurement feedback to the control unit 11, when the nomadic module 20 is uncoupled. In this case, the air purifier operates in a closed loop (the ventilation is driven according to air quality measurement feedback). It is also possible to envision making the air purifier operate in an open loop (without any air quality measurement feedback), if no air sensor other than the nomadic air sensor is provided. In this case, the air purifier can only be in two conditions: turned on or turned off directly by the user.

It is also possible to envision another human-machine interface 33 formed by a portable electronic appliance (a touch tablet or a smart mobile phone) to display the measurements from the nomadic air sensor, or to drive the control unit. In this case, the human-machine interface 31 of the nomadic air module 20 is optional.

Figure 2:
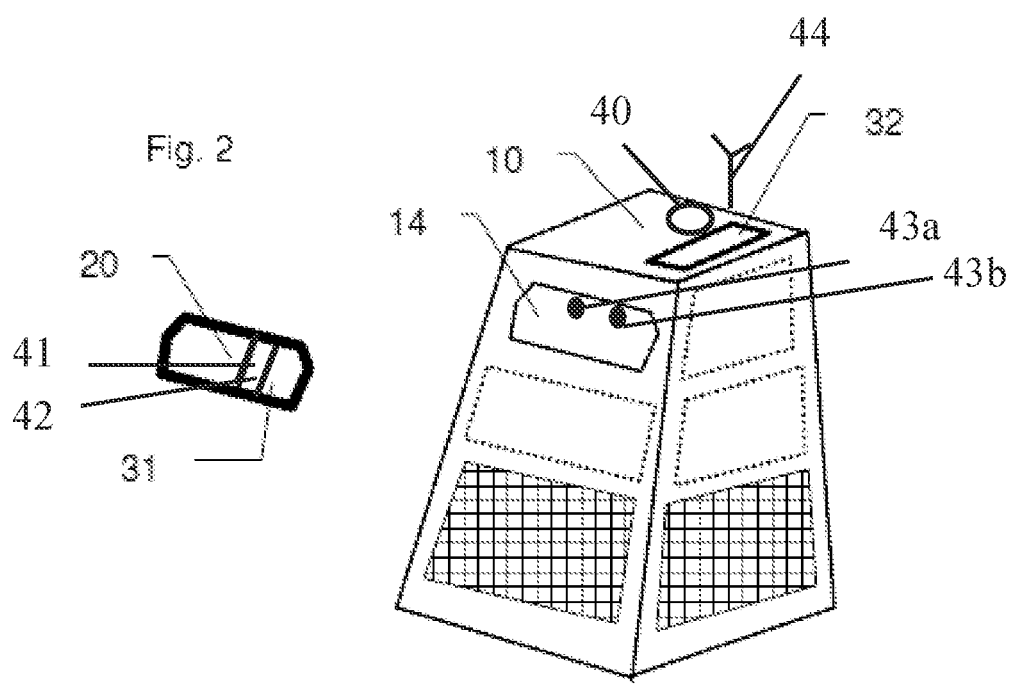
FIG. 2 represents the system in FIG. 1, with the nomadic module uncoupled from the air purifier according to an embodiment of the invention.

It is also possible to envision another human-machine interface 32 visible in FIGS. 1 and 2, permanently installed on the air purifier 10, to drive the latter directly.

Figure 3:
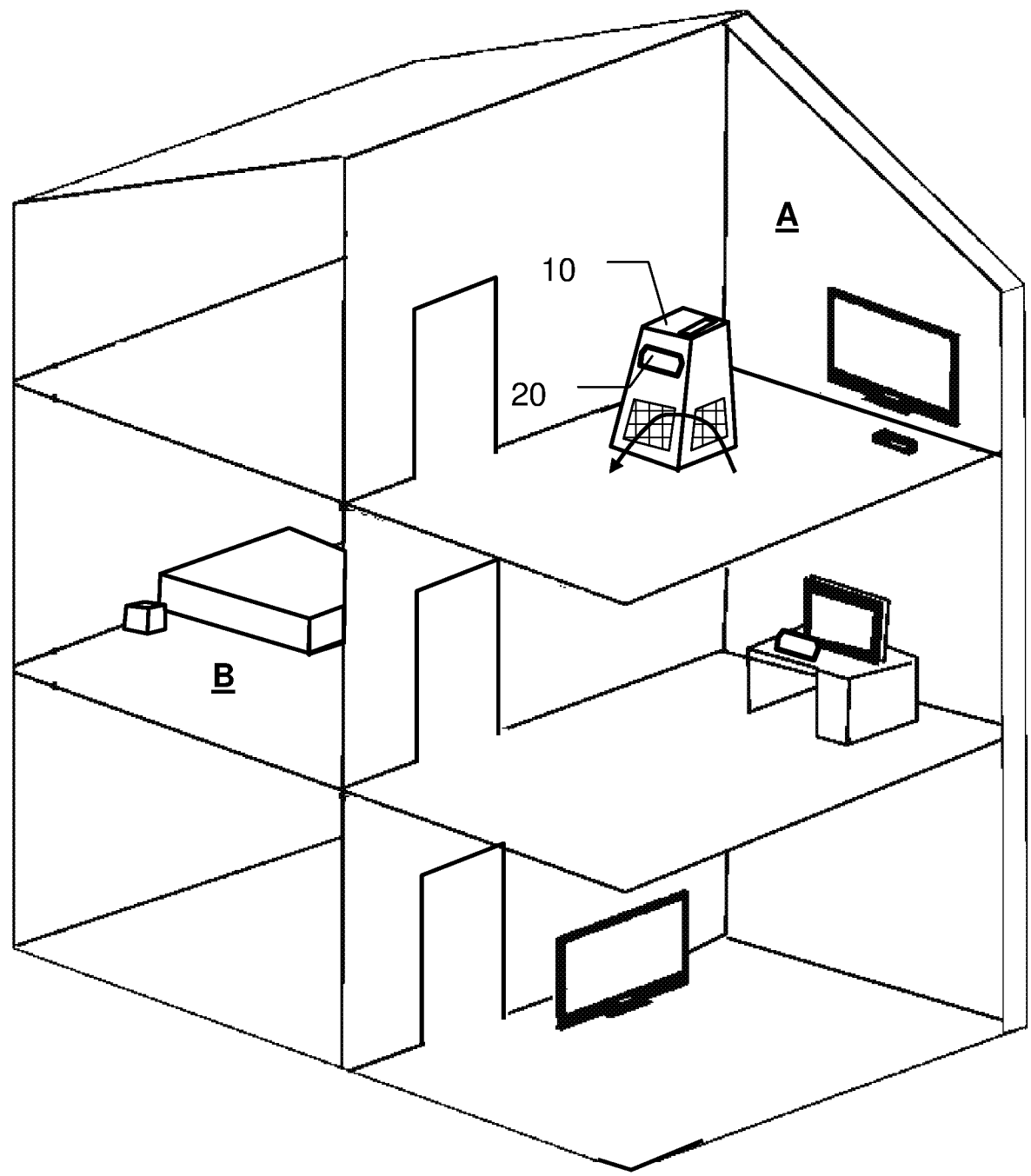
FIG. 3 represents a first mode of using the air purification system from FIGS. 1 and 2 according to an embodiment of the invention.

FIG. 3 represents the use according to the coupled operating mode. The air purifier 10 is situated in a room A of the dwelling of a user, as well as the nomadic module 20 which is here in an attached position and a coupled status. One could also very well envision using the nomadic module 20 in the detached position, but then it must be in the room A. In fact, according to the coupled operating mode, the air purifier 10 is driven according to the measurements from the nomadic air sensor integrated in the nomadic module 20. It is possible to envision forcing operation in the coupled operating mode once the nomadic module 20 is attached to the air purifier 10, in order to change it to the coupled status.

Figure 4:
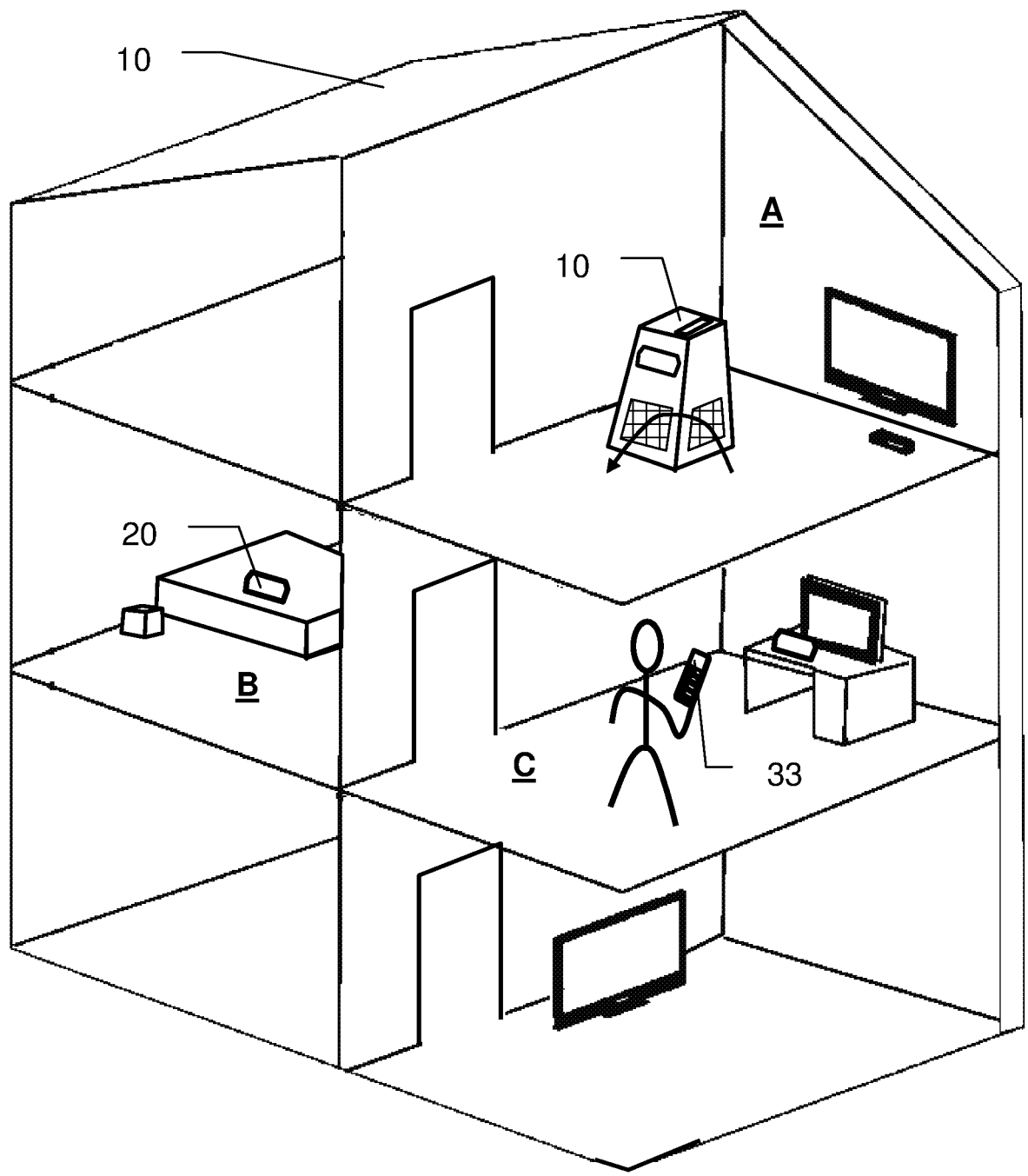
FIG. 4 represents a second mode of using the air purification system from FIGS. 1 and 2 according to an embodiment of the invention, and FIG. 5a schematically illustrates the air purifier 10 including various components and FIG. 5b schematically illustrates the nomadic module 20 including various components.

FIG. 4 represents the use according to the uncoupled operating mode. The air purifier 10 is situated in a room A of the dwelling of a user and operates continuously, regardless of the measurements taken by the nomadic air sensor which is uncoupled. In fact, the nomadic module 20 which here is in a detached position, is placed in a room B on the lower floor of the dwelling. In this case, the human-machine interface 31 of the nomadic module 20 displays the measurements taken by the nomadic air sensor.

The change to the uncoupled operating mode can be controlled by the user himself via one of the human-machine interfaces, or once the nomadic module is physically detached from the air purifier 10. It is also possible to envision automatically changing to the uncoupled operating mode and uncoupling the nomadic module 20 as soon as a wireless signal sent to the air purifier 10 by the nomadic module 20 has a level lower than a predetermined threshold, indicating that the nomadic module 20 is situated beyond a predetermined distance (in sum, as soon as the signal is "lost").

It is possible to envision as seen above another human-machine interface 33 formed by a mobile telephone held by the user in a third room C of the dwelling, and also displaying the measurements from the nomadic air sensor. The flexibility of the system is improved. In this way, if the user simply sees that the air quality in the room B is unsatisfactory, he can move the air purifier 10 into this room B later.

To allow this use, it is possible to envision equipping the air purifier 10 and the nomadic module 20 with wireless communication units (radio, WIFI, Bluetooth or other) to transmit data directly between the described appliances, or via an internet network, for example.

Figure 5B:
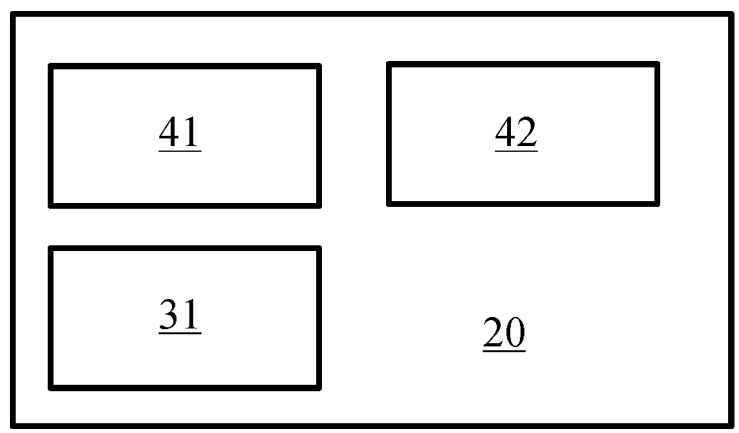

Finally, the nomadic air module 20 is equipped with a system for storing electricity (e.g. a battery), and also with an autonomous fan 41 unit (see FIG. 5b), to be able to operate autonomously, in particular during the uncoupled operating mode. The autonomous fan unit 41 is designed to create an airflow towards a measuring section 42 of the nomadic air sensor 20.

It will be understood that various modifications and/or improvements obvious to the person skilled in the art may be made to various embodiments of the invention described in this description without departing from the context of the invention defined by the attached claims.

The invention claimed is:

1. An air purification system comprising: —an air purifier with a control unit and a filtration unit controlled by the control unit, —at least one human-machine interface, —at least one nomadic air sensor configured to be removably attached and digitally connectable to the air purifier and to carry out measurements of one or more air parameters, the control unit being configured to receive from the at least one human-machine interface at least: an instruction to control the filtration unit according to a coupled operating mode in which the at least one nomadic air sensor is attached to, and digitally connected to, the air purifier and transmits measurement information to the control unit of the air purifier, and in which the control unit of the air purifier takes into account measurement feedback from the coupled nomadic air sensor to control the filtration unit, and an instruction to control the filtration unit according to an uncoupled operating mode in which the at least one nomadic air sensor is digitally disconnected from the air purifier and the at least one nomadic air sensor does not transmit measurement information to the control unit of the air purifier, and in which the control unit of the air purifier does not take into account measurement feedback from the digitally disconnected nomadic air sensor to control the filtration unit, wherein in the uncoupled operating mode of the air purifier, the at least one human-machine interface is configured to display said measurements measured by the digitally disconnected nomadic air sensor, wherein in the uncoupled operating mode, the nomadic air sensor does not transmit measurement information to the control unit of the air purifier regardless of whether the nomadic air sensor is physically attached to or detached from the air purifier, wherein a change from the coupled operating mode to the uncoupled operating mode is controllable via the at least one human-machine interface, and wherein in the uncoupled operating mode, the at least one human-machine interface is detachable from the air purifier.

2. The air purification system according to claim 1, comprising at least one other air sensor, and wherein the uncoupled operating mode comprises:
- a closed-looped operating mode in which the control unit of the air purifier takes into account measurement feedback from the at least one other air sensor, or
- an open-loop operating mode in which the control unit of the air purifier does not take into account any air sensor measurement feedback.

3. The air purification system according to claim 2, wherein, in the coupled operating mode, the control unit takes into account:
- only the measurements from the nomadic air sensor, or
- measurements from the nomadic air sensor and measurements from the one other air sensor.

4. The air purification system according to claim 2, wherein in the coupled operating mode of the purifier, the control unit takes into account the worst of the measurements among the measurements sent by the nomadic air sensor and by the other air sensor.

5. The air purification system according to claim 1, comprising a nomadic module which integrates the nomadic air sensor and the at least one human-machine interface.

6. The air purification system according to claim 5, wherein the nomadic module comprises an autonomous fan unit, configured to create an airflow towards a measuring section of the nomadic air sensor.

7. The air purification system according to claim 1, comprising a portable electronic multimedia appliance configured to form the human-machine interface configured to display the measurements of the nomadic air sensor.

8. The air purification system according to claim 7, wherein the portable electronic multimedia appliance is a touch tablet or a smart phone.

9. The air purification system according to claim 8, wherein the human-machine interface is a first human-machine interface configured to display the measurements from the digitally disconnected nomadic air sensor during the uncoupled operating mode, and the air purification system comprises a second human-machine interface designed to control the air purifier during the uncoupled operating mode.

10. The air purification system according to claim 9, wherein the first human-machine interface is integral with the nomadic air sensor.

11. The air purification system according to claim 9, wherein the second human-machine interface is integral with the air purifier.

12. The air purification system according to claim 1, comprising contact terminals configured to establish electrical contact between the air purifier and the nomadic air sensor when the latter is coupled to the air purifier.

13. The air purification system according to claim 1, comprising a contactless connection interface, configured to establish a contactless connection between the air purifier and the nomadic air sensor.

14. A method for using an air purification system according to claim 1, comprising:
- controlling the air purifier from the at least one human-machine interface to make the filtration unit operate in a room of a dwelling;
- positioning the detached nomadic air sensor in a location situated at a distance from the air purifier, and then controlling the filtration unit according to the uncoupled operating mode, and
- displaying on the human-machine interface measurements from the nomadic air sensor.

15. The method according to claim 14, comprising:
- moving the air purifier to the location previously situated at a distance;
- controlling the air purifier from the at least one human-machine interface;
- coupling the nomadic air sensor with the air purifier, and making the filtration unit operate according to the coupled operating mode in the location.

16. The method according to claim 15, wherein the purification unit is automatically controlled according to the coupled operating mode when the nomadic air sensor is attached again to the air purifier.

17. The method according to claim 14, wherein, if the nomadic air sensor is coupled and attached to the air purifier and if the purification unit is operating in coupled operating mode, then the method comprises automatically making the purification unit operate in uncoupled operating mode when the nomadic air sensor is detached from the air purifier.

18. The method according to claim 14, the location is in another room in the dwelling.

19. The air purification system according to claim 1, comprising a portable electronic multimedia appliance that forms the human-machine interface configured to display the measurements of the nomadic air sensor, said portable electronic multimedia appliance being separate from the air purifier and the nomadic sensor, said portable electronic multimedia appliance being remotely connected to the nomadic air sensor in the uncoupled operating mode of the air purifier.

20. The air purification system according to claim 1, wherein the one or more air parameters include at least one of a volatile organic compound content, a carbon monoxide content, a particle content, a temperature, a relative humidity, an atmospheric pressure, and a carbon dioxide content.

* * * * *